US012700177B2

(12) United States Patent
Zhang et al.

(10) Patent No.: US 12,700,177 B2
(45) Date of Patent: Aug. 4, 2026

(54) POINT CLOUD DATA PROCESSING METHOD, AND ROBOT AND ROBOT CONTROL METHOD USING THE SAME

(71) Applicant: UBTECH ROBOTICS CORP LTD, Shenzhen (CN)

(72) Inventors: Shen Zhang, Shenzhen (CN); Yu Tang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 154 days.

(21) Appl. No.: 18/931,139

(22) Filed: Oct. 30, 2024

(65) Prior Publication Data

US 2025/0209739 A1     Jun. 26, 2025

(30) Foreign Application Priority Data

Dec. 20, 2023    (CN) .......................... 202311766605.7

(51) Int. Cl.
| | |
|---|---|
| G06T 17/00 | (2006.01) |
| B25J 9/16 | (2006.01) |
| G06T 5/70 | (2024.01) |
| G06T 7/12 | (2017.01) |

(52) U.S. Cl.
CPC ............. G06T 17/00 (2013.01); B25J 9/1666 (2013.01); G06T 5/70 (2024.01); G06T 7/12

(2017.01); *G06T 2207/10024* (2013.01); *G06T 2207/10028* (2013.01); *G06T 2207/20084* (2013.01)

(58) Field of Classification Search
CPC .. G06T 17/00; G06T 7/12; G06T 5/70; G06T 2207/10024; G06T 2207/10028; G06T 2207/20084; B25J 9/1666
See application file for complete search history.

(56) References Cited

U.S. PATENT DOCUMENTS

| | | | |
|---|---|---|---|
| 2019/0057509 A1* | 2/2019 | Lv ............................ | G06T 7/254 |
| 2020/0302681 A1* | 9/2020 | Totty ...................... | G06T 15/205 |
| 2024/0005547 A1* | 1/2024 | Lin ........................... | G06T 7/70 |
| 2024/0312177 A1* | 9/2024 | Redford ................. | G06V 10/44 |

* cited by examiner

*Primary Examiner* — Xin Sheng

(57) ABSTRACT

A point cloud data processing method, and a robot and a robot control method using the same are provided. The method includes: obtaining image data including an RGB image and a depth image that is collected through an RGBD camera; obtaining an original mask image by segmenting out targets from the RGB image using a target segmentation mode; obtaining an optimized mask image by performing a pixel-level processing on the mask image; obtaining, based on the optimized mask image and the depth image, a plane equation of each of the targets in the optimized mask image; performing, using the plane equation of each of the targets, a depth value assignment on a plane position of the target in the optimized mask image that is not assigned with the depth value; and obtaining target point cloud data by performing a point cloud conversion on the depth image.

20 Claims, 12 Drawing Sheets

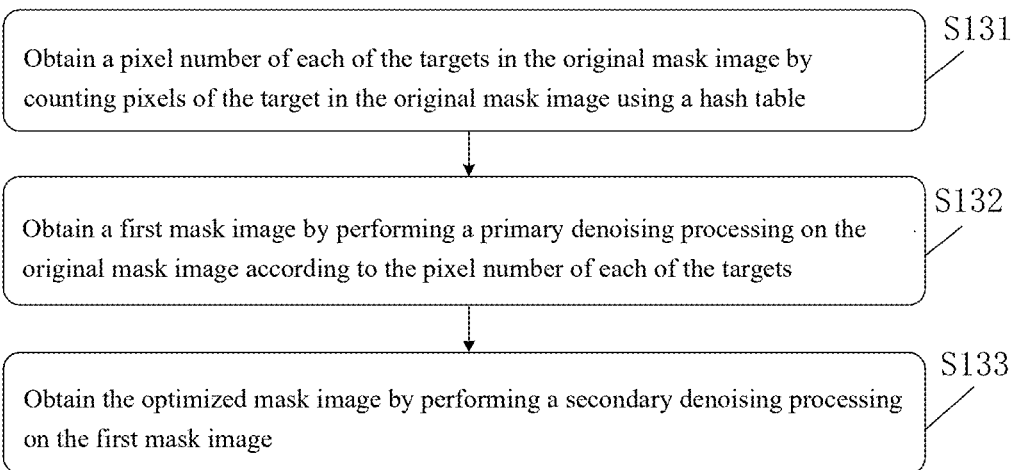

Obtain a pixel number of each of the targets in the original mask image by counting pixels of the target in the original mask image using a hash table

S131

Obtain a first mask image by performing a primary denoising processing on the original mask image according to the pixel number of each of the targets

S132

Obtain the optimized mask image by performing a secondary denoising processing on the first mask image

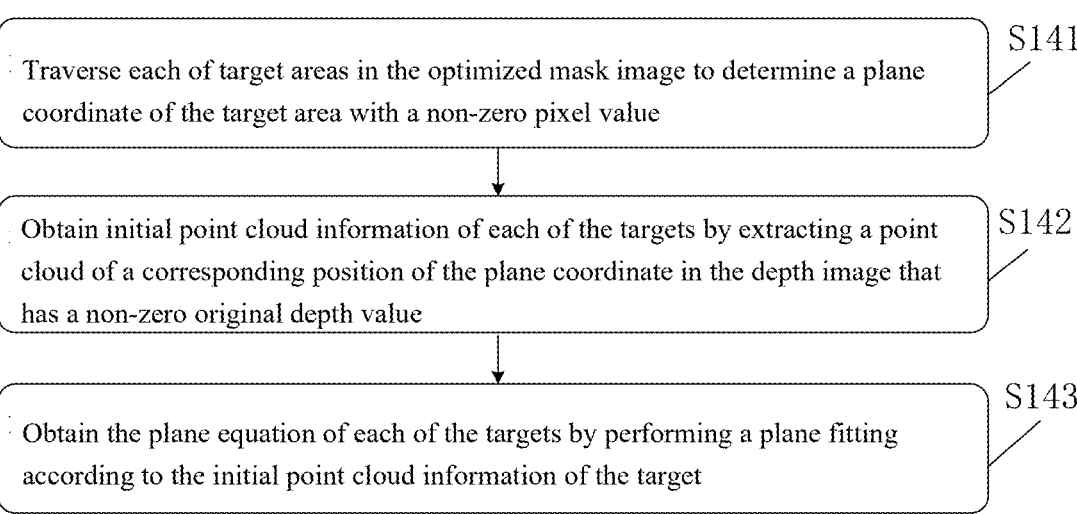

Traverse each of target areas in the optimized mask image to determine a plane coordinate of the target area with a non-zero pixel value

S141

Obtain initial point cloud information of each of the targets by extracting a point cloud of a corresponding position of the plane coordinate in the depth image that has a non-zero original depth value

S142

Obtain the plane equation of each of the targets by performing a plane fitting according to the initial point cloud information of the target

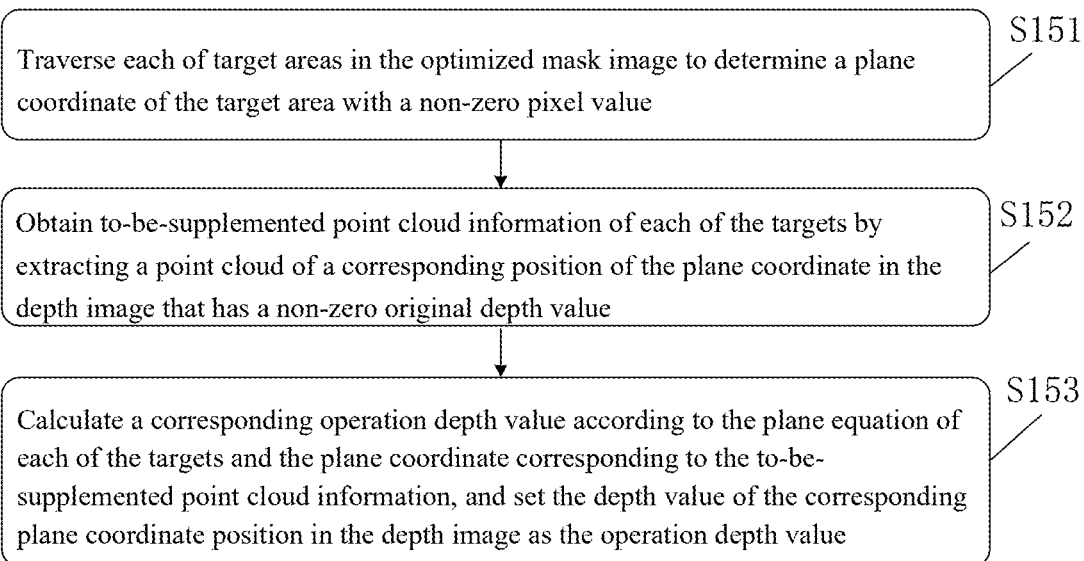

Traverse each of target areas in the optimized mask image to determine a plane coordinate of the target area with a non-zero pixel value   S151

Obtain to-be-supplemented point cloud information of each of the targets by extracting a point cloud of a corresponding position of the plane coordinate in the depth image that has a non-zero original depth value   S152

Calculate a corresponding operation depth value according to the plane equation of each of the targets and the plane coordinate corresponding to the to-be-supplemented point cloud information, and set the depth value of the corresponding plane coordinate position in the depth image as the operation depth value   S153

FIG. 5

Obtain image data of a scene where the robot is located that is collected by the RGBD camera    S210

Obtain augmented target point cloud data by performing the point cloud data processing method on the image data    S220

Perform, based on the target point cloud data, obstacle avoidance on the robot    S230

POINT CLOUD DATA PROCESSING METHOD, AND ROBOT AND ROBOT CONTROL METHOD USING THE SAME

CROSS REFERENCE TO RELATED APPLICATIONS

The present disclosure claims priority to Chinese Patent Application No. 202311766605.7, filed Dec. 20, 2023, which is hereby incorporated by reference herein as if set forth in its entirety.

TECHNICAL FIELD

The present disclosure relates to data processing technology, and particularly to a point cloud data processing method, and a robot and a robot control method using the same.

BACKGROUND

The application of robots is becoming more and more widespread. For example, in 4S stores, robots can be used to substitute store clerks for introducing vehicles and communicating with customers, which will save a lot of costs. At present, the robots in 4S stores use lasers for navigation. When an obstacle is detected through laser, the robot will autonomously avoid the obstacle. However, it is found that laser-based navigation will have some problems in identifying dark objects, because dark or black objects will absorb lasers, resulting in the robot not being able to detect obstacles such as black vehicles or chairs, which is prone to scratches and will cause great losses especially for new cars.

BRIEF DESCRIPTION OF DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

FIG. 3 is a flow chart of a pixel-level processing in the point cloud data processing method of FIG. 2.

FIG. 4 is a flow chart of a plane equation obtaining in the point cloud data processing method of FIG. 2.

FIG. 5 is a flow chart of a depth value assignment in the point cloud data processing method of FIG. 2.

DETAILED DESCRIPTION

Figure 1A:
FIG. 1a and FIG. 1b are respectively a grayscale display and a depth map of an RGB image collected in a scene of indoor navigation.

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure.

The components of the embodiments of the present disclosure that are described and illustrated in the drawings herein may generally be arranged and designed in a variety of different configurations. Therefore, the following detailed description of the embodiments of the present disclosure provided in the drawings is not intended to limit the scope of the present disclosure, but merely represent the selected embodiments of the present disclosure. Based on the embodiments of the present disclosure, all other embodiments obtained by those of ordinary skill in the art without creative work fall within the protection scope of the present disclosure.

In the following, the terms "including", "having" and their cognates that can be used in the embodiments of the present disclosure are only intended to indicate specific features, numbers, steps, operations, elements, components or their combinations, and should not be understood as for excluding the existence of one or more other features, numbers, steps, operations, elements, components or their combinations, or the possibility of increasing one or more features, numbers, steps, operations, elements, components or their combinations. In addition, the terms "first", "second", "third", and the like in the descriptions are only used for distinguishing, and cannot be understood as indicating or implying relative importance.

Unless otherwise defined, all terms (including technical terms and scientific terms) used herein have the same meaning as those generally understood by ordinary technicians in the field to which the embodiments of the present disclosure belong. The terms (e.g., those defined in generally used dictionaries) should be interpreted as having the same meaning as the contextual meaning in the relevant technical field and will not be interpreted as having an idealized meaning or an overly formal meaning unless clearly defined in the embodiments of the present disclosure.

Some embodiments of the present disclosure will be described in detail below with reference to the drawings. The following embodiments and the features therein may be combined with each other while there is no confliction therebetween.

Figure 1B:
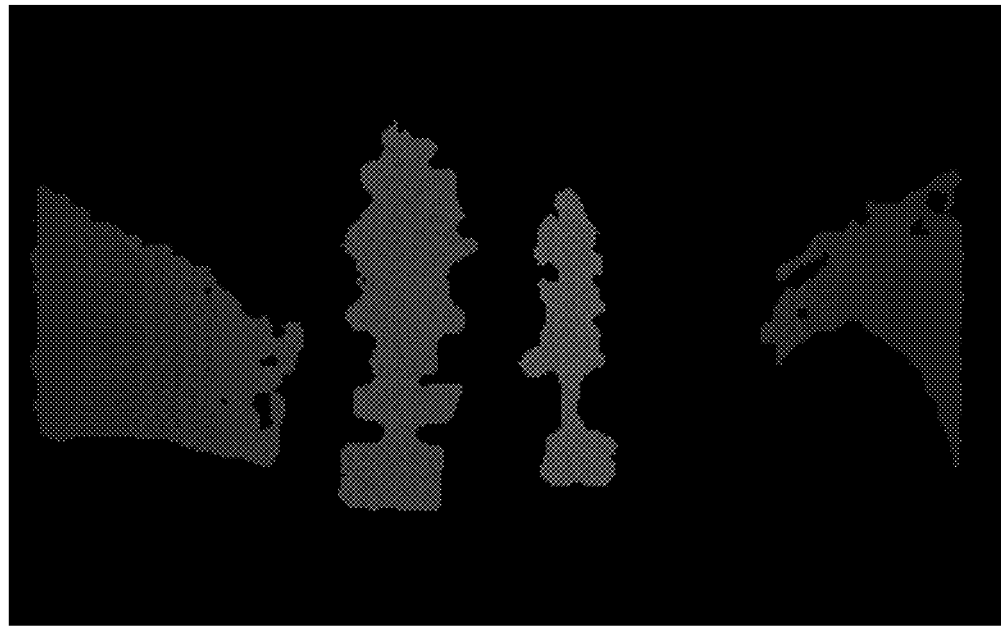

At present, a movable device such as a robot generally performs obstacle avoidance using depth information. FIG. 1a and FIG. 1b are respectively a grayscale display and a depth map of an RGB image collected in a scene of indoor navigation. As shown in FIG. 1a, in a scene image which is an RGB image (having converted to a grayscale image) captured by the robot for navigation scene of 4S shop, it can be seen that there are two vehicles of different colors in the RGB image (a yellow vehicle on the left and a dark red vehicle on the right) and a baffle rack located in front of the two vehicles. Correspondingly, as shown in FIG. 1b, in a corresponding depth image, it can be seen that depth data of the yellow vehicle on the left is more than that of the dark red vehicle on the right, and there is only a few point cloud data of the vehicle on the right above the wheel. In this case, it can easily cause the robot to misjudge, and is likely to collide with the right vehicle when need to pass between two vehicles.

For the forgoing problem, in the present disclosure, a point cloud data processing method is provided, which uses color information and depth information in the RGBD image to augment point cloud so as to obtain more target point cloud data, which may be used to improve the robot's recognition of dark objects such as vehicles so as to effectively avoid collisions with the dark objects.

The point cloud data processing method will be described below in conjunction with some specific embodiments.

Figure 2:
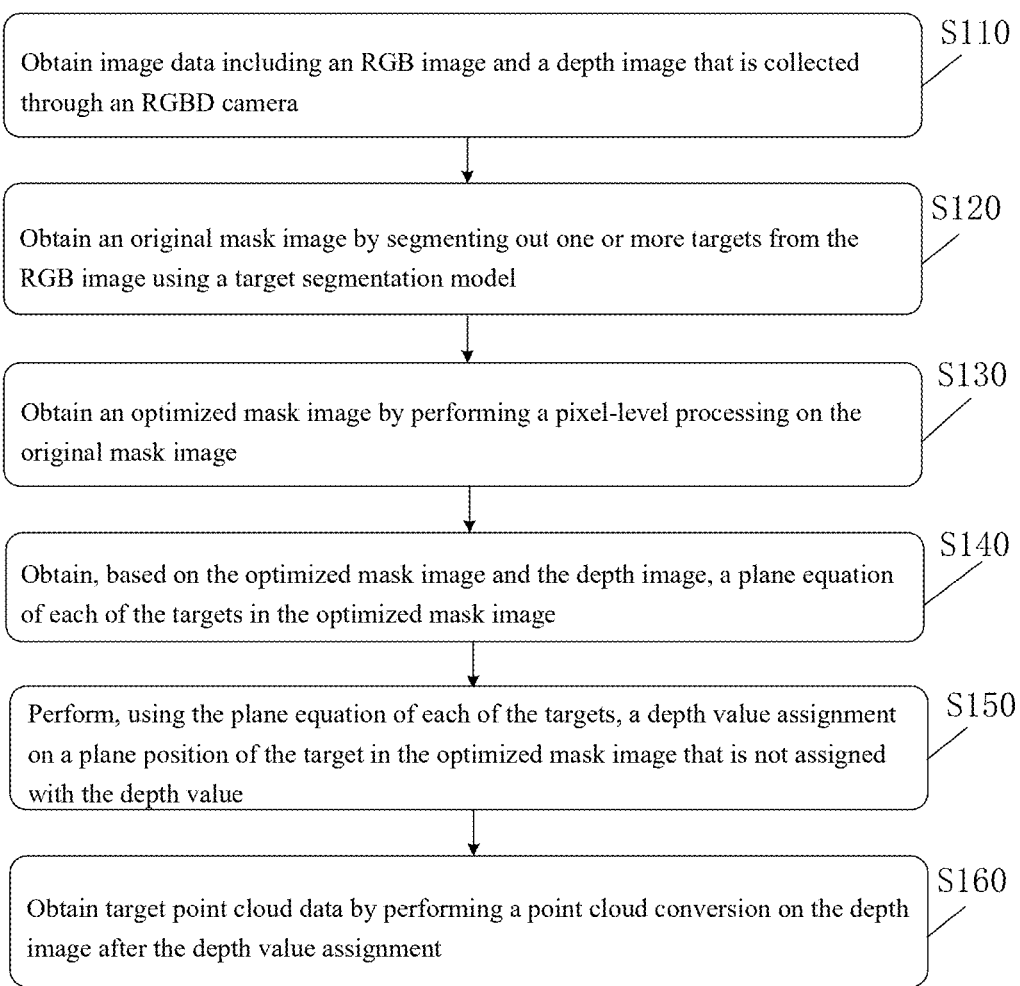
FIG. 2 is a flow chart of a point cloud data processing method according to an embodiment of the present disclosure.

FIG. 2 is a flow chart of a point cloud data processing method according to an embodiment of the present disclosure. A method for processing point cloud data may be applied on (a processor of) an apparatus for processing point cloud data shown in FIG. 8. In other embodiments, the method may be implemented through a robot control apparatus shown in FIG. 9 or a robot shown in FIG. 10. As shown in FIG. 2, as an example, in this embodiment, the point cloud data processing method may include the following steps.

S110: obtaining image data including an RGB image and a depth image that is collected through an RGBD camera.

In which, the RGBD camera is a camera which can simultaneously obtain color (RGB) images and depth information, where its principle is based on the combination of an RGB camera and a depth sensor. In this embodiment, the RGBD camera is used to collect image data of the scene where it is located so as to obtain RGB color information and depth information of a target in the scene.

It should be noted that, in this embodiment, the color information and the depth information are used simultaneously to enhance the obtaining of point cloud data of the darker targets, so as to improve the recognition and detection of the dark targets.

S120: obtaining an original mask image by segmenting out one or more targets from the RGB image using a target segmentation model.

In which, the target segmentation model is for performing image segmentation on the target of interest, so as to obtain the area (i.e., a target area) where the target is located from image. It should be noted that the target segmentation model may be constructed and trained using a commonly used neural network (e.g., RNN and CNN). The existing technologies for model training may be used.

In this embodiment, the target may be any object or objective in the scene which may include a vehicle, an animal, a table, a chair, or the like and may be defined according to actual needs.

As an example, after the target segmentation is performed using the target segmentation model, a mask containing target areas may be obtained. Taking the RGB image in FIG. 1*a* as an example, a mask image containing two vehicle areas can be obtained by segmenting using a vehicle segmentation model, where the pixel values are different because each vehicle has a different color.

It should be noted that in image segmentation, the original image usually needs to be segmented into different parts for further analysis and processing, and the mask image may be used to describe the contour of the target area. For example, the mask image may be a binary image or a grayscale image. When the grayscale image is used, a background and the target area are distinguished by grayscale values. Generally, the target area has a higher pixel grayscale value, while the background has a lower pixel grayscale value.

S130: obtaining an optimized mask image by performing a pixel-level processing on the original mask image.

Considering that the RGBD camera may be not so accurate for depth values at a long distance, while there may be the target located farer away in the scene, the farer target may be removed as noise. In addition, in this embodiment, because the target segmentation model sometimes has inaccurate results during segmentation, pixel-level denoising may be performed on the original mask image to provide a more accurate data basis for the subsequent plane fitting.

For example, it may use two pixel-level denoising processes. FIG. 3 is a flow chart of a pixel-level processing in the point cloud data processing method of FIG. 2. As shown in FIG. 3, as an example, step S130 may include the following sub-steps.

S131: obtaining a pixel number of each of the targets in the original mask image by counting pixels of the target in the original mask image using a hash table.

Taking a vehicle as the target as an example, the number of pixels of each vehicle in the original mask image may be obtained by counting using a hash table.

S132: obtaining a first mask image by performing a primary denoising processing on the original mask image according to the pixel number of each of the targets.

In which, the first-level denoising process is mainly for removing the distant targets in the original mask image. As an example, it may set, according to the pixel number of each of the targets, a target area of the target in the original mask image that has pixels of the pixel number less than a first preset threshold as a background. For example, assuming that the first preset threshold is set to 3000, according to the pixel number of each target, the pixel value of the target area with the pixel number less than 3000 is assigned to 0, that is, it is set as the background. It should be noted that the value of the first preset threshold may be set according to actual needs.

S133: obtaining the optimized mask image by performing a secondary denoising processing on the first mask image.

In which, the secondary denoising is mainly for removing the points in the mask image after the primary denoising processing that do not actually belong to the target area. As an example, it may determine a connected area of each of mask areas in the first mask image, and set the mask area with the connected area less than a second preset threshold as the background.

For example, assuming that the second preset threshold is set to 30000, the pixel value of the mask area with the connected area having less than 30000 pixels is assigned to 0 to make it the background. It should be noted that the value of the second preset threshold may be set according to actual needs.

S140: obtaining, based on the optimized mask image and the depth image, a plane equation of each of the targets in the optimized mask image.

In this embodiment, the above-mentioned plane fitting may be performed on the sparse point cloud of the vehicle based on the optimized mask image so as to obtain the plane equation, thereby performing a point cloud augmentation on the positions of the vehicle where there is no point cloud.

FIG. 4 is a flow chart of a plane equation obtaining in the point cloud data processing method of FIG. 2. As shown in FIG. 4, as an example, step S140 may include the following sub-steps.

S141: traversing each of target areas in the optimized mask image to determine a plane coordinate of the target area with a non-zero pixel value.

S142: obtaining initial point cloud information of each of the targets by extracting a point cloud of a corresponding position of the plane coordinate in the depth image that has a non-zero original depth value.

As an example, the target areas in the optimized mask image are traversed, if the pixel value of the target area in the optimized mask image is not 0, the two-dimensional plane coordinate of the pixel point is recorded as (x, y). At the same time, the corresponding position of the pixel point in the depth map is found, if the depth value at the position is not 0, the point is recorded, and the coordinate information at this time is recorded as (x, y, z), where z is the depth value.

Therefore, by using all the points in the target area that meet the forgoing conditions, the initial point cloud information of the target, that is, the sparse point cloud, may be obtained.

S143: obtaining the plane equation of each of the targets by performing a plane fitting according to the initial point cloud information of the target.

In this embodiment, the plane equation of the target is obtained by fitting, so as to supplement the point cloud of the target on the fitted plane, thereby obtaining more point cloud data of the target. For example, for each target, the plane equation of the targets may be obtained by performing the plane fitting on the initial point cloud information of the target using an algorithm such as least squares method. In which, the least squares method is a method for determining parameters by minimizing the sum of squares of errors. For example, the general expression of the plane equation is: $Ax+By+Cz+D=0$, where A, B, C and D are parameters to be solved.

S150: performing, using the plane equation of each of the targets, a depth value assignment on a plane position of the target in the optimized mask image that is not assigned with the depth value.

FIG. 5 is a flow chart of a depth value assignment in the point cloud data processing method of FIG. 2. As shown in FIG. 5, as an example, in this embodiment, step S150 may include the following sub-steps.

S151: traversing each of target areas in the optimized mask image to determine a plane coordinate of the target area with a non-zero pixel value.

S152: obtaining to-be-supplemented point cloud information of each of the targets by extracting a point cloud of a corresponding position of the plane coordinate in the depth image that has a non-zero original depth value.

One plane coordinate (i.e., the plane position) may be determined as not being assigned with the depth value when the (original) depth value at the plane position is zero; otherwise, the plane coordinate may be determined as being assigned with the depth value when the (original) depth value at the plane position is not zero. As an example, each target in the optimized mask image may be traversed, if the pixel value of the target area in the optimized mask image is not 0, it is recorded as (x, y), and then the corresponding position of the pixel point in the depth map is found, if the depth value at the position is 0, the point is recorded, thereby obtaining the to-be-supplemented point cloud information (i.e., the point cloud information that needs to be supplemented).

S153: calculating a corresponding operation depth value according to the plane equation of each of the targets and the plane coordinate corresponding to the to-be-supplemented point cloud information, and setting the depth value of the corresponding plane coordinate position in the depth image as the operation depth value.

As an example, in the depth value assignment, the (x, y) of the point whose pixel value is not 0 is substituted into the plane equation of the target to calculate an operational depth value $z_0$, then the depth value corresponding to the position of the point in the depth map is updated from the original 0 to $z_0$.

S160: obtaining target point cloud data by performing a point cloud conversion on the depth image after the depth value assignment.

As an example, through the above-mentioned depth value assignment, the updated depth map can be obtained, and then the updated depth map may be converted into a point cloud, thereby obtaining the augmented target point cloud data.

Figure 6A:
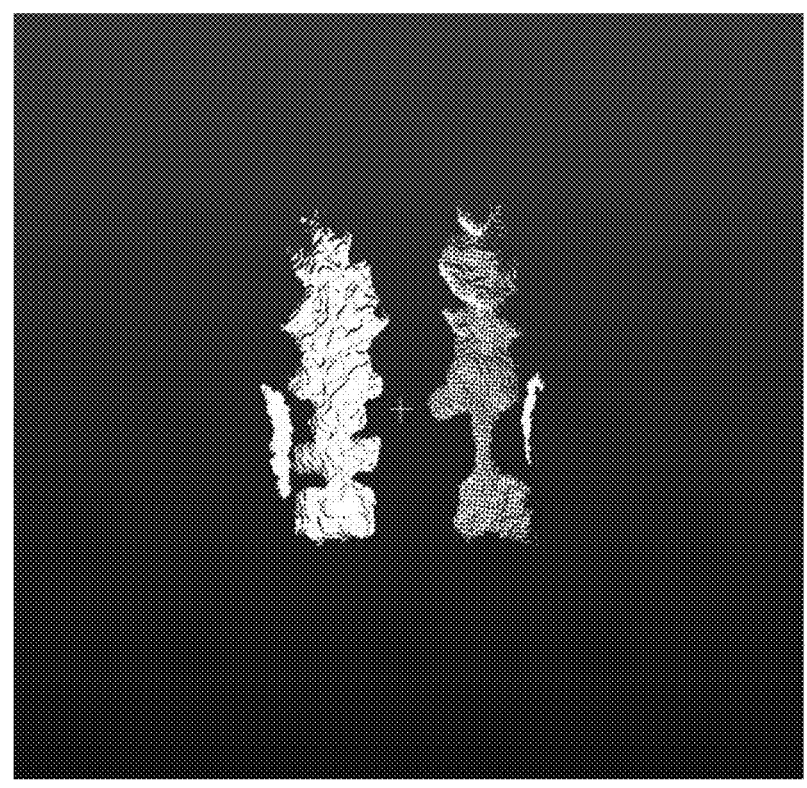
FIG. 6a and FIG. 6b are respectively a diagram of an initial point cloud obtained based on the depth map of FIG. 1b and a top view of an augmented point cloud obtained using the method of FIG. 2.
Figure 6B:
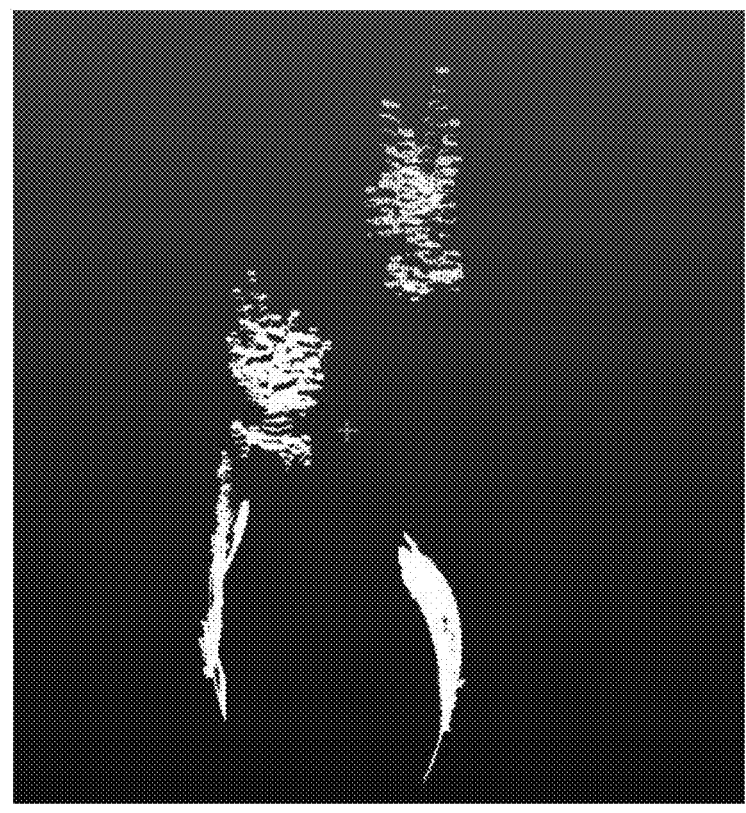

FIG. 6a and FIG. 6b are respectively a diagram of an initial point cloud obtained based on the depth map of FIG. 1b and a top view of an augmented point cloud obtained using the method of FIG. 2. FIG. 6a shows the initial point cloud information of the two vehicles in FIG. 1a is processed by the point cloud data processing method to obtain the augmented target point cloud data shown in FIG. 6b. It can be seen from the top view of FIG. 6b that the point cloud data of the vehicle on the left and the vehicle on the right are both supplemented to a certain extent. As a result, it can be known that the point cloud data processing method can effectively solve the problem of the existing robot that the inefficient laser detection for dark or black objects.

In this embodiment, the point cloud data processing method uses a neural network segmentation model to segment out the target in the RGB image collected by the RGBD camera, and then performs plane fitting based on the segmentation result using the small amount of initial point clouds of the target. After obtaining the plane equation, the point cloud augmentation is performed on the positions in the target area where there is no point cloud, thereby obtaining more point cloud data of the target so that the possibility of collision with the target can be greatly reduced when avoiding obstacles.

Figure 7:
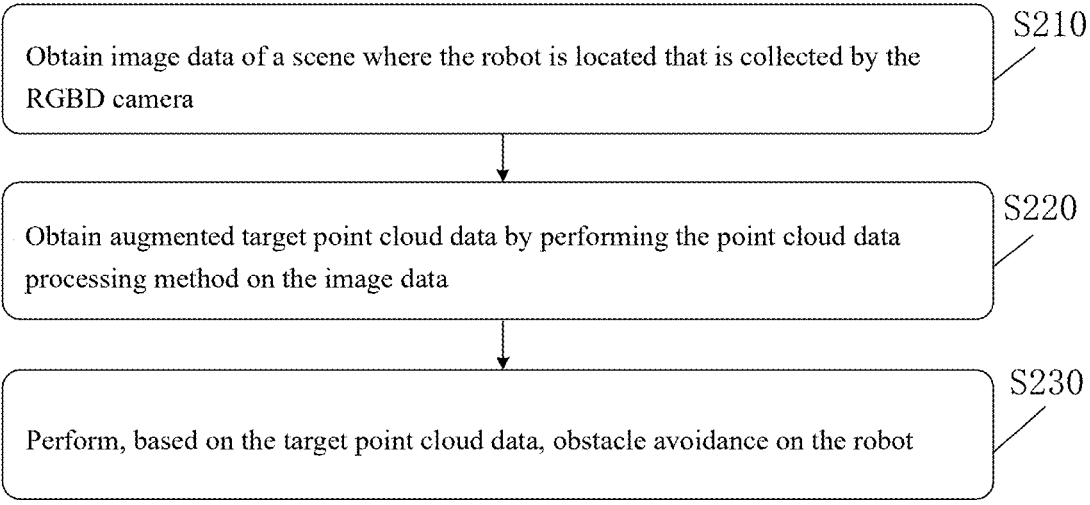
FIG. 7 is a flow chart of a robot control method according to an embodiment of the present disclosure.

FIG. 7 is a flow chart of a robot control method according to an embodiment of the present disclosure. A method for controlling a robot having an RGBD camera may be applied on the robot control apparatus shown in FIG. 9 or the robot shown in FIG. 10. As shown in FIG. 7, as an example, in this embodiment, the robot control method may include the following steps.

S210: obtaining image data of a scene where the robot is located that is collected by the RGBD camera.

For example, during the robot walks, the RGBD camera may be controlled to collect images of the scene where the robot is located, thereby obtaining the above-mentioned image data. It should be noted that the image data includes the target of interest that needs to be supplemented with point clouds. In which, the target mainly refers to the objective in the scene where the robot is located, for example, an object such as a vehicle, a table, a chair, a sofa, or the like, where the specific shape is not limited.

S220: obtaining augmented target point cloud data by performing the point cloud data processing method of the above-mentioned embodiment on the image data.

It should be noted that the options in the point cloud data processing method of the above-mentioned embodiment are also applicable to this embodiment.

S230: performing, based on the target point cloud data, obstacle avoidance on the robot.

For example, the robot may determine the position of the target based on the target point cloud data, and then perform an obstacle avoidance path planning using a path planning algorithm with obstacle position constraints, thereby avoiding the target and ensure the safety of the robot and the target.

Figure 8:
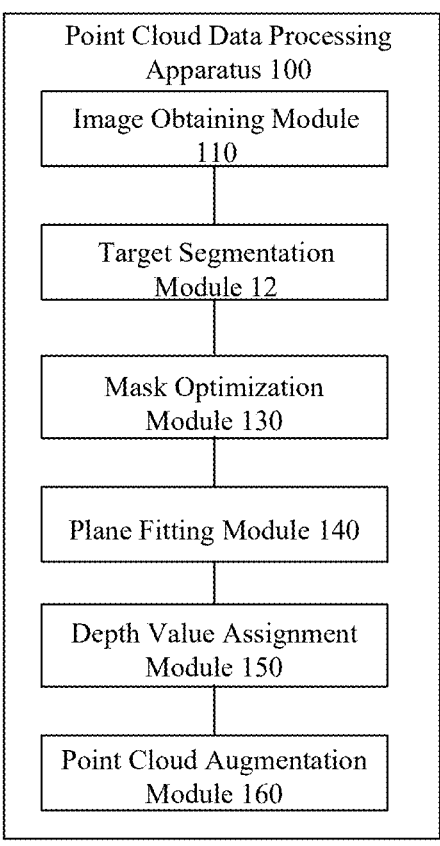
FIG. 8 is a schematic diagram of the structure of a point cloud data processing apparatus according to an embodiment of the present disclosure.

FIG. 8 is a schematic diagram of the structure of a point cloud data processing apparatus 100 according to an embodiment of the present disclosure. As shown in FIG. 8, as an example, in this embodiment, the point cloud data processing apparatus 100 may include:

an image obtaining module 110 configured to obtain image data including an RGB image and a depth image that is collected through an RGBD camera;

a target segmentation module 120 configured to obtain an original mask image by segmenting out one or more targets from the RGB image using a target segmentation model;

a mask optimization module 130 configured to obtain a processed optimized mask image by performing a pixel-level processing on the original mask image;

a plane fitting module 140 configured to obtain, based on the optimized mask image and the depth image, a plane equation of each of the targets in the optimized mask image;

a depth value assignment module 150 configured to perform, using the plane equation of each of the targets, a depth value assignment on a plane position of the target in the optimized mask image that is not assigned with the depth value; and a point cloud augmentation module 160 configured to obtain augmented target point cloud data by performing a point cloud conversion on the depth image after the depth value assignment It should be noted that the apparatus of this embodiment corresponds to the point cloud data processing method of the above-mentioned embodiment, and the options in the above-mentioned embodiment are also applicable to this embodiment.

Figure 9:
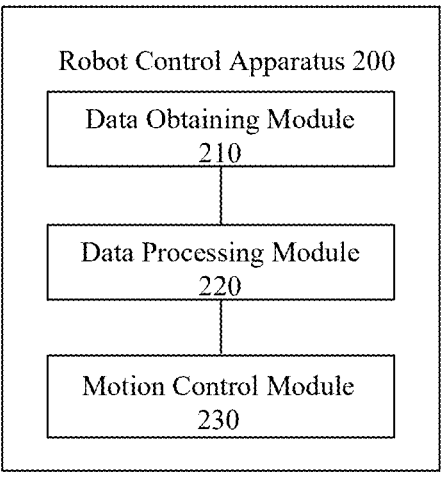
FIG. 9 is a schematic diagram of the structure of a robot control apparatus according to an embodiment of the present disclosure.

FIG. 9 is a schematic diagram of the structure of a robot control apparatus 200 according to an embodiment of the present disclosure. A robot such as the robot shown in FIG. 1 may include the robot control apparatus 200. As shown in FIG. 9, as an example, in this embodiment, the robot control apparatus 200 may include:

a data obtaining module 210 configured to obtaining image data of a scene where the robot is located that is collected by the RGBD camera;

a data processing module 220 configured to obtaining augmented target point cloud data by performing the point cloud data processing method of the above-mentioned embodiment on the image data; and a motion control module 230 configured to performing, based on the target point cloud data, obstacle avoidance on the robot.

It should be noted that the apparatus of this embodiment corresponds to the robot control method of the above-mentioned embodiment, and the options in the above-mentioned embodiment are also applicable to this embodiment.

Figure 10:
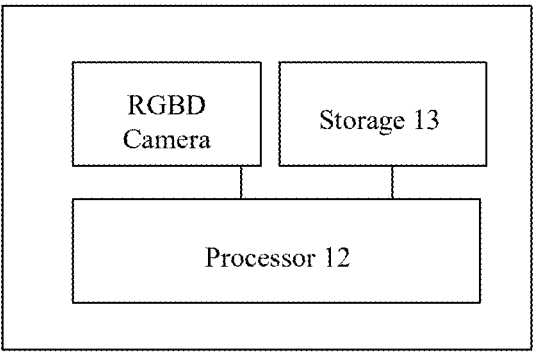
FIG. 10 is a schematic diagram of the structure of a robot according to an embodiment of the present disclosure.

FIG. 10 is a schematic diagram of the structure of a robot 10 according to an embodiment of the present disclosure. The robot 10 may be applied to different fields, which may be a navigation robot, a detection robot, or other robot that uses a laser radar or a camera to obtain and utilize point cloud information.

As an example, the robot 10 may include an RGBD camera 11, a processor 12, and a storage 13. In which, the RGBD camera 11 may be disposed on the head of the robot or disposed above the robot for collecting images. The storage 13 stores computer program(s), and the processor 12 executes the computer program(s) so that the robot executes the point cloud data processing method or the robot control method of the above-mentioned embodiments.

In which, the processor 12 may be an integrated circuit chip with signal processing capability. The processor 12 may be a general purpose processor including at least one of a central processing unit (CPU), a graphics processing unit (GPU), a network processor (NP), a digital signal processor (DSP), an application specific integrated circuit (ASIC), a field-programmable gate array (FPGA) or other programmable logic devices, discrete gate, transistor logic device, and discrete hardware component. The general purpose processor may be a microprocessor or the processor may also be any conventional processor that may implement or execute the methods, steps, and the logical block diagrams disclosed in the embodiments of the present disclosure The storage 13 may be, but not limited to, a random access memory (RAM), a read only memory (ROM), a programmable read only memory (PROM), erasable programmable read-Only memory (EPROM), electrical erasable programmable read-only memory (EEPROM), or the like. In which, the storage 13 is used for storing computer programs, and the processor 12 can execute the computer programs correspondingly after receiving execution instructions.

In addition, the present disclosure further provides a computer-readable storage medium for storing the computer program(s) used in the above-mentioned robot. When the computer program(s) are executed on the processor, the point cloud data processing method or the robot control method of the above-mentioned embodiments is implemented.

For example, the readable storage medium includes a variety of media such as a USB disk, a mobile hard disk, a read-only memory (ROM), a random access memory (RAM), a magnetic disk, and an optical disk which is capable of storing program codes.

In the embodiments of the present disclosure, it should be understood that the disclosed method and apparatus may be implemented in other manners. The above-mentioned apparatus embodiment is merely illustrative, for example, the flow charts and structural diagrams in the drawings show the architecture, functions and operations that are possible to be implemented by the apparatus, method and computer program products of the embodiments. In this regard, each block in the flowchart or block diagram may represent a module, a program segment, or a part of codes that include one or more computer executable instructions for implementing specified logical functions. It should also be noted that, in alternative implementations, the functions noted in the blocks may occur out of the order noted in the figures. For example, two blocks in succession may, in fact, be executed substantially concurrently, or may sometimes be executed in the reverse order, depending upon the functionality involved. It is also to be noted that each block in the block diagrams and/or flow charts, and the combination of blocks in the block diagrams and/or flow charts, may be implemented by a dedicated hardware-based system for performing the specified function or action, or may be implemented by a combination of special purpose hardware and computer instructions.

In addition, each functional module or unit in each embodiment of the present disclosure may be integrated to form an independent part, each module or unit may exist independently, or two or more modules or units may be integrated to form an independent part.

The functions can be stored in a computer readable storage medium if it is implemented in the form of a software functional unit and sold or utilized as a separate product. Based on this understanding, the technical solution of the present disclosure, either essentially or in part, contributes to the prior art, or a part of the technical solution can be embodied in the form of a software product. The software product is stored in a storage medium, which includes a number of instructions for enabling a computer device (which can be a smart phone, a personal computer, a server, a network device, etc.) to execute all or a part of the steps of the methods described in each of the embodiments of the present disclosure.

The forgoing is only the specific embodiment of the present disclosure, while the scope of the present disclosure is not limited thereto. For those skilled in the art, modifications or replacements that can be easily conceived within the technical scope of the present disclosure should be included within the scope of the present disclosure.

What is claimed is:

1. A point cloud data processing method, comprising:
collecting, through an RGBD camera, image data including an RGB image and a depth image;
obtaining an original mask image by segmenting out one or more targets from the RGB image using a target segmentation model;
obtaining an optimized mask image by performing a pixel-level processing on the original mask image;
obtaining, based on the optimized mask image and the depth image, a plane equation of each of the targets in the optimized mask image;
performing, using the plane equation of each of the targets, a depth value assignment on a plane position of the target in the optimized mask image in response to the depth value not being assigned at the plane position; and
obtaining target point cloud data by performing a point cloud conversion on the depth image after the depth value assignment.

2. The method of claim 1, wherein obtaining the optimized mask image by performing the pixel-level processing on the original mask image comprises:
obtaining a pixel number of each of the targets in the original mask image by counting pixels of the target in the original mask image using a hash table;
obtaining a first mask image by performing a primary denoising processing on the original mask image according to the pixel number of each of the targets; and
obtaining the optimized mask image by performing a secondary denoising processing on the first mask image.

3. The method of claim 2, wherein performing the primary denoising processing on the original mask image according to the pixel number of each of the targets comprises:
setting, according to the pixel number of each of the targets, a target area of the target in the original mask image that has pixels of the pixel number less than a first preset threshold as a background.

4. The method of claim 2, wherein performing the secondary denoising processing on the first mask image comprises:
determining a connected area of each of mask areas in the first mask image, and setting the mask area with the connected area having pixels less than a second preset threshold as a background.

5. The method of claim 1, wherein obtaining, based on the optimized mask image and the depth image, a plane equation of each of the targets in the optimized mask image comprises:
traversing each of target areas in the optimized mask image to determine a plane coordinate of the target area with a non-zero pixel value, and obtaining initial point cloud information of each of the targets by extracting a point cloud of a corresponding position of the plane coordinate in the depth image, wherein the corresponding position has a non-zero original depth value; and
obtaining the plane equation of each of the targets by performing a plane fitting according to the initial point cloud information of the target.

6. The method of claim 5, wherein obtaining the plane equation of each of the targets by performing the plane fitting according to the initial point cloud information of the target comprises:
obtaining the plane equation of each of the targets by performing the plane fitting on the initial point cloud information of the target using a least squares method.

7. The method of claim 1, wherein performing, using the plane equation of each of the targets, a depth value assignment on a plane position of the target in the optimized mask image comprises:
traversing each of target areas in the optimized mask image to determine a plane coordinate of the target area with a non-zero pixel value, and obtaining to-be-supplemented point cloud information of each of the targets by extracting a point cloud of a corresponding position of the plane coordinate in the depth image, wherein the corresponding position has a non-zero original depth value; and
calculating a corresponding operation depth value according to the plane equation of each of the targets and the plane coordinate corresponding to the to-be-supplemented point cloud information, and setting the depth value of the corresponding plane coordinate position in the depth image as the operation depth value.

8. The method of claim 1, wherein the target segmentation model is a neural network.

9. A control method for a robot having an RGBD camera, comprising:
collecting, through the RGBD camera, image data including an RGB image and a depth image;
obtaining an original mask image by segmenting out one or more targets from the RGB image using a target segmentation model;
obtaining an optimized mask image by performing a pixel-level processing on the original mask image;
obtaining, based on the optimized mask image and the depth image, a plane equation of each of the targets in the optimized mask image;
performing, using the plane equation of each of the targets, a depth value assignment on a plane position of the target in the optimized mask image in response to the depth value not being assigned at the plane position;
obtaining target point cloud data by performing a point cloud conversion on the depth image after the depth value assignment; and
performing, based on the target point cloud data, obstacle avoidance on the robot.

10. The method of claim 9, wherein performing, based on the target point cloud data, obstacle avoidance on the robot comprises:
determining, based on the target point cloud data, a position of an obstacle; and planning, based on the position of the obstacle, a path for the robot to avoid the obstacle.

11. A robot, comprising:

an RGBD camera;

a processor;

a memory coupled to the processor; and one or more computer programs stored in the memory and executable on the processor;

wherein, the one or more computer programs comprise:

instructions for collecting, through the RGBD camera, image data including an RGB image and a depth image;

instructions for obtaining an original mask image by segmenting out one or more targets from the RGB image using a target segmentation model;

instructions for obtaining an optimized mask image by performing a pixel-level processing on the original mask image;

instructions for obtaining, based on the optimized mask image and the depth image, a plane equation of each of the targets in the optimized mask image;

instructions for performing, using the plane equation of each of the targets, a depth value assignment on a plane position of the target in the optimized mask image in response to the depth value not being assigned at the plane position; and instructions for obtaining target point cloud data by performing a point cloud conversion on the depth image after the depth value assignment.

12. The robot of claim 11, wherein the instructions for obtaining the optimized mask image by performing the pixel-level processing on the original mask image comprise:

instructions for obtaining a pixel number of each of the targets in the original mask image by counting pixels of the target in the original mask image using a hash table;

instructions for obtaining a first mask image by performing a primary denoising processing on the original mask image according to the pixel number of each of the targets; and instructions for obtaining the optimized mask image by performing a secondary denoising processing on the first mask image.

13. The robot of claim 12, wherein the instructions for performing the primary denoising processing on the original mask image according to the pixel number of each of the targets comprise:

instructions for setting, according to the pixel number of each of the targets, a target area of the target in the original mask image that has pixels of the pixel number less than a first preset threshold as a background.

14. The robot of claim 12, wherein the instructions for performing the secondary denoising processing on the first mask image comprise:

instructions for determining a connected area of each of mask areas in the first mask image, and setting the mask area with the connected area having pixels less than a second preset threshold as a background.

15. The robot of claim 11, wherein the instructions for obtaining, based on the optimized mask image and the depth image, a plane equation of each of the targets in the optimized mask image comprise:

instructions for traversing each of target areas in the optimized mask image to determine a plane coordinate of the target area with a non-zero pixel value, and obtaining initial point cloud information of each of the targets by extracting a point cloud of a corresponding position of the plane coordinate in the depth image, wherein the corresponding position has a non-zero original depth value; and instructions for obtaining the plane equation of each of the targets by performing a plane fitting according to the initial point cloud information of the target.

16. The robot of claim 15, wherein the instructions for obtaining the plane equation of each of the targets by performing the plane fitting according to the initial point cloud information of the target comprise:

instructions for obtaining the plane equation of each of the targets by performing the plane fitting on the initial point cloud information of the target using a least squares method.

17. The robot of claim 11, wherein the instructions for performing, using the plane equation of each of the targets, a depth value assignment on a plane position of the target in the optimized mask image comprise:

instructions for traversing each of target areas in the optimized mask image to determine a plane coordinate of the target area with a non-zero pixel value, and obtaining to-be-supplemented point cloud information of each of the targets by extracting a point cloud of a corresponding position of the plane coordinate in the depth image, wherein the corresponding position has a non-zero original depth value; and instructions for calculating a corresponding operation depth value according to the plane equation of each of the targets and the plane coordinate corresponding to the to-be-supplemented point cloud information, and setting the depth value of the corresponding plane coordinate position in the depth image as the operation depth value.

18. The robot of claim 11, wherein the target segmentation model is a neural network.

19. The robot of claim 11, the one or more computer programs further comprise:

instructions for performing, based on the target point cloud data, obstacle avoidance on the robot.

20. The robot of claim 19, wherein the instructions for performing, based on the target point cloud data, obstacle avoidance on the robot comprise:

instructions for determining, based on the target point cloud data, a position of an obstacle; and instructions for planning, based on the position of the obstacle, a path for the robot to avoid the obstacle.

* * * * *